US011975431B1

(12) United States Patent
Burchell

(10) Patent No.: US 11,975,431 B1
(45) Date of Patent: May 7, 2024

(54) DOOR KNOB HANDLING APPARATUS AND METHODS OF USING SAME

(71) Applicant: William A. Burchell, Columbia, SC (US)

(72) Inventor: William A. Burchell, Columbia, SC (US)

( * ) Notice: Subject to any disclaimer, the term of this patent is extended or adjusted under 35 U.S.C. 154(b) by 752 days.

(21) Appl. No.: 16/598,659

(22) Filed: Oct. 10, 2019

Related U.S. Application Data

(60) Provisional application No. 62/743,699, filed on Oct. 10, 2018.

(51) Int. Cl.

| | |
|---|---|
| ***B25B 5/00*** | (2006.01) |
| ***B25B 5/14*** | (2006.01) |
| ***B25B 5/16*** | (2006.01) |
| ***E05B 17/06*** | (2006.01) |

(52) U.S. Cl.
CPC .................. *B25B 5/16* (2013.01); *B25B 5/14* (2013.01); *E05B 17/06* (2013.01)

(58) Field of Classification Search
CPC .. B25B 5/16; B25B 5/14; B25B 5/125; B25B 5/107
See application file for complete search history.

(56) References Cited

U.S. PATENT DOCUMENTS

| | | | | |
|---|---|---|---|---|
| 267,055 | A | 11/1882 | Blackman | |
| 2,488,484 | A * | 11/1949 | Vander Clute | B25B 7/02 81/421 |
| 4,428,570 | A | 1/1984 | Foshee et al. | |
| 6,193,449 | B1 | 2/2001 | Diaz | |
| 6,290,219 | B1 * | 9/2001 | Barbosa | B25B 5/102 269/155 |
| 6,390,738 | B1 | 5/2002 | Fridman | |
| 8,628,070 | B2 * | 1/2014 | Neubauer | B25B 5/003 81/304 |
| 9,302,370 | B2 | 4/2016 | Nadeau | |
| 10,328,552 | B2 * | 6/2019 | Forseth | B25B 5/142 |
| 2002/0059696 | A1 | 5/2002 | Nakasone et al. | |
| 2013/0270758 | A1 * | 10/2013 | Wittliff, III | B23K 37/0452 29/559 |

FOREIGN PATENT DOCUMENTS

DE 102009036909 A1 3/2011

* cited by examiner

*Primary Examiner* — Lee D Wilson
(74) *Attorney, Agent, or Firm* — Maynard Nexsen PC; Todd Allen Serbin

(57) ABSTRACT

A door knob handling apparatus for installing a door knob to a door, comprising: a clamping section configured to attach the apparatus to the door, wherein the clamping section includes a handle side and a gripping side; and, a holding section, including a yoke, configured to hold the door knob while the door knob is installed and attached to the clamping section.

15 Claims, 8 Drawing Sheets

DOOR KNOB HANDLING APPARATUS AND METHODS OF USING SAME

RELATED APPLICATIONS

This application claims the benefit of priority under 35 USC § 119(e) of U.S. Provisional Patent Application No. 62/743,699 filed Oct. 10, 2018, the contents of which are incorporated herein by reference in their entirety.

FIELD AND BACKGROUND OF THE INVENTION

The present invention, in some embodiments thereof, relates to the construction industry, and, more particularly, but not exclusively, to an installation tool.

Previous attempts in this field include US267055, U.S. Pat. Nos. 4,428,570, 6,193,449, 6,390,738 and DE102009036909, the disclosures of which are incorporated herein in their entireties.

SUMMARY OF THE INVENTION

According to an aspect of some embodiments of the present invention there is provided a door knob handling apparatus for installing a door knob to a door, comprising: a clamping section configured to attach the apparatus to the door; and, a holding section configured to hold the door knob while the door knob is installed.

There is further provided a method of using a door knob handling apparatus for installing a door knob to a door, comprising: placing a yoke of the door knob handling apparatus around a stem of the door knob; opening a clamping section of the apparatus and placing a gripping side of the clamping section around a side of the door; closing the clamping section when the side of the door is located within the gripping side of the clamping section to releasably secure the apparatus to the door; re-opening the clamping section when the door knob has been installed to release the apparatus from the door; and, removing the apparatus from the door.

There is further provided a door knob handling apparatus for installing a door knob to a door, comprising: a clamping section configured to attach the apparatus to the door, wherein the clamping section includes a handle side and a gripping side; and, a holding section, including a yoke, configured to hold the door knob while the door knob is installed and attached to the clamping section.

In an embodiment of the invention, the clamping section is spring loaded and biased by the spring to be in a closed or clamped position.

In an embodiment of the invention, the apparatus further comprises padding or covers disposed on at least the handle side to enhance user comfort when gripping.

In an embodiment of the invention, the apparatus further comprises covers disposed on the gripping side which are configured to enhance the gripping and/or friction of the gripping side on the door and/or to protect the surface of the door when the apparatus is clamped thereon.

In an embodiment of the invention, the clamping section is configured to apply clamping pressure on a door up to 2 in. thick.

In an embodiment of the invention, the clamping section is configured to apply clamping pressure on a door over 2 in. thick.

In an embodiment of the invention, the holding section has covers disposed thereon which are configured to enhance the gripping and/or frictional forces between the door knob handling apparatus and the door knob.

In an embodiment of the invention, the holding section is fixed in relation to the clamping section.

In an embodiment of the invention, the holding section is rotatably attached to the clamping section.

In an embodiment of the invention, the holding section is connected to the clamping section by a hinge or pin joint.

There is further provided a method of using a door knob handling apparatus for installing a door knob to a door, comprising: placing a yoke of the door knob handling apparatus around a stem of the door knob; opening a clamping section of the apparatus and placing a gripping side of the clamping section around a side of the door; closing the clamping section when the side of the door is located within the gripping side of the clamping section to releasably secure the apparatus to the door; re-opening the clamping section when the door knob has been installed to release the apparatus from the door; and, removing the apparatus from the door.

In an embodiment of the invention, the door knob handling apparatus is clamped to the door at a location on the door where the holding section can be properly positioned to hold the door knob.

In an embodiment of the invention, clamping factors in the length of the holding section and the angle of the door knob to the door knob handling apparatus.

In an embodiment of the invention, the knob handling apparatus is turned over to hold a door knob on an opposite side of the door from the configuration of the apparatus where the clamping section is on one side of the apparatus and the holding section is on an opposite side of the apparatus with respect to the clamping section. There is further provided a method of using a door knob handling apparatus for installing a dead bolt to a door, comprising: placing a yoke of the door knob handling apparatus around or on a face of the dead bolt; opening a clamping section of the apparatus and placing a gripping side of the clamping section around a side of the door; closing the clamping section when the side of the door is located within the gripping side of the clamping section to releasably secure the apparatus to the door; re-opening the clamping section when the dead bolt has been installed to release the apparatus from the door; and, removing the apparatus from the door.

In an embodiment of the invention, the face is raised from and substantially parallel to the surface of the door.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example, are not necessarily to scale, and are for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
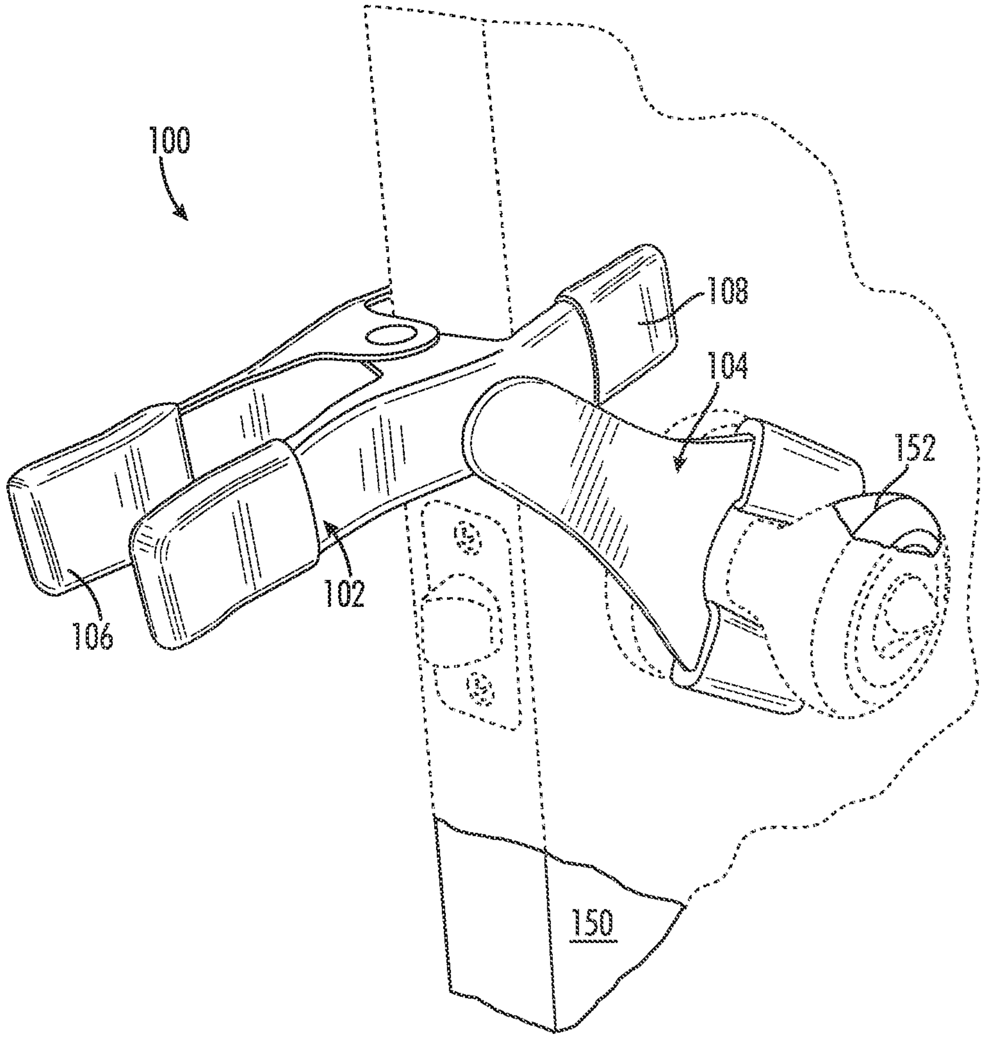
FIG. 1 is a perspective view of a door knob handling apparatus, in accordance with an exemplary embodiment of the invention.

The present invention, in some embodiments thereof, relates to the construction industry, and, more particularly, but not exclusively, to an installation tool.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a perspective view of a door knob handling apparatus 100, in accordance with an exemplary embodiment of the invention. Generally, the door knob handling apparatus 100 is a device configured to make installing door knobs easier by holding a door knob in place while leaving both of the user's hands free to install the bolts and adjust a back side of the door knob. It is conceived that the door knob handling apparatus 100 is useable for exterior and interior doors. Optionally, the door knob handling apparatus 100 is also used for the installation of dead bolts.

In an embodiment of the invention, the door knob handling apparatus 100 comprises a clamping section 102 and a holding section 104. In some embodiments of the invention, the clamping section 102 is actuated to clamp the door knob handling apparatus 100 to a door 150 while the holding section 104 is used to hold a door knob 152 being attached to the door 150. It is to be understood that the door knob handling apparatus 100 is clamped to the door 150 at a location on the door 150 where the holding section 104 can be properly positioned to hold the door knob 152, factoring in the length of the holding section 104 and the angle of the door knob 152 to the door knob handling apparatus 100, as examples.

The clamping section 102, in some embodiments of the invention, is configured similar to the clamp of commonly understood jumper cables, where there is a handle side 106 and an opposing gripping side 108. Optionally, the clamping section 102 is spring loaded and biased by the spring to be in a closed or clamped position. In some embodiments of the invention, the clamping section 102 is provided with padding or covers to enhance user comfort when gripping the handle side 106. In some embodiments of the invention, the gripping side 108 is provided with covers which are configured to enhance the gripping and/or friction of the gripping side 108 on the door 150 and/or to protect the surface of the door when the apparatus 100 is clamped thereon. In an embodiment of the invention, the clamping section 102 is configured to apply clamping pressure on doors up to 2 in. thick. For example, by designing the overall length of the gripping clamps and/or handles and/or length of the hinge 402 joint elements (such that the space between the two sides of the gripping section 102 is greater when the two sides are parallel to one another) to accommodate a door up to a desired thickness. Optionally, the clamping section 102 is configured to accommodate doors over 2 in. thick, for example adjusting the length and/or shape (for example, being L-shaped or angled) of the handle side 106 and/or gripping side 108.

In some embodiments of the invention, the holding section 104 is provided with covers which are configured to enhance the gripping and/or frictional forces between the door knob handling apparatus 100 and the door knob 152. Additionally, alternatively and/or optionally, the covers are configured to protect the door knob 152, for example to prevent scratching and/or abrasion of the door knob 152 finish while using the door knob handling apparatus 100. In some embodiments of the invention, the holding section is adjustable in embracing width to accommodate different sized door knob stems.

In some embodiments of the invention, the main body of the apparatus 100 is constructed out of a metal or some other similar strong and durable material.

Figure 2:
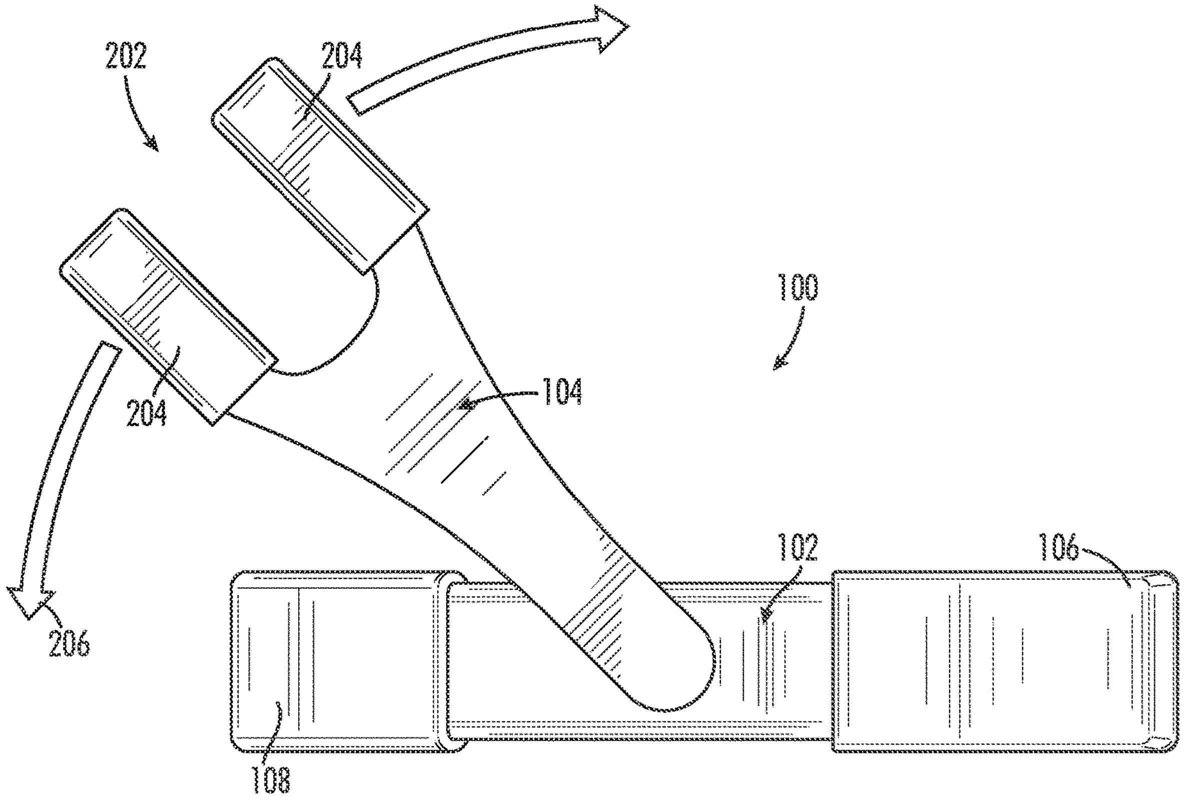
FIG. 2 is a top view of a door knob handling apparatus, in accordance with an exemplary embodiment of the invention.
Figure 3:
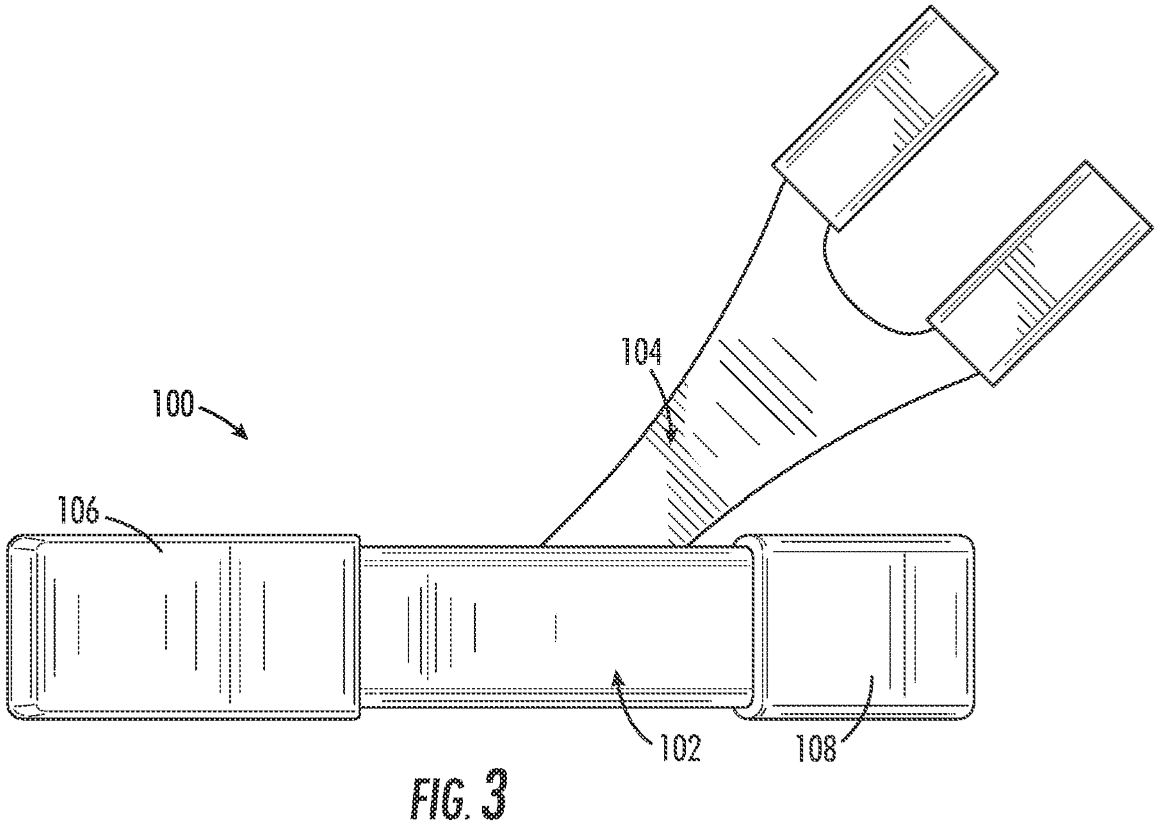
FIG. 3 is a bottom view of a door knob handling apparatus, in accordance with an exemplary embodiment of the invention.

FIG. 2 is a top view of the door knob handling apparatus 100, in accordance with an exemplary embodiment of the invention. From this view, a door knob yoke 204 of the holding section 104 is more clearly seen, wherein two prongs of the yoke 204 are configured to be placed on either side of a stem of the door knob 152, while a nook 202 is configured for receipt of the stem of the door knob 152 therein. In some embodiments, the holding section 104 is fixed in relation to the clamping section 102. In some embodiments of the invention, the holding section 104 is configured to rotate 206, for example with a hinge or pin joint, to accommodate for varying placement/orientation of the door knob 152 from one door to another with respect to the side of the door on which the clamping section 102 is clamped. FIG. 3 is a bottom view of the door knob handling apparatus 100, in accordance with an exemplary embodiment of the invention. Optionally, the clamping section 102 is fixed in relation to the holding section 104.

In some embodiments of the invention, the apparatus 100 is turned over to hold a door knob or deadbolt on an opposite side of the door from the natural configuration of the apparatus 100 (where the clamping section 102 is on one side of the apparatus 100 and the holding section 104 is on an opposite side of the apparatus 100 with respect to the clamping section 102, so to provide usability with both sides of a door, the apparatus 100 can merely be flipped over to switch which side the sections 102, 104 are on with respect to the door.)

Figure 4:
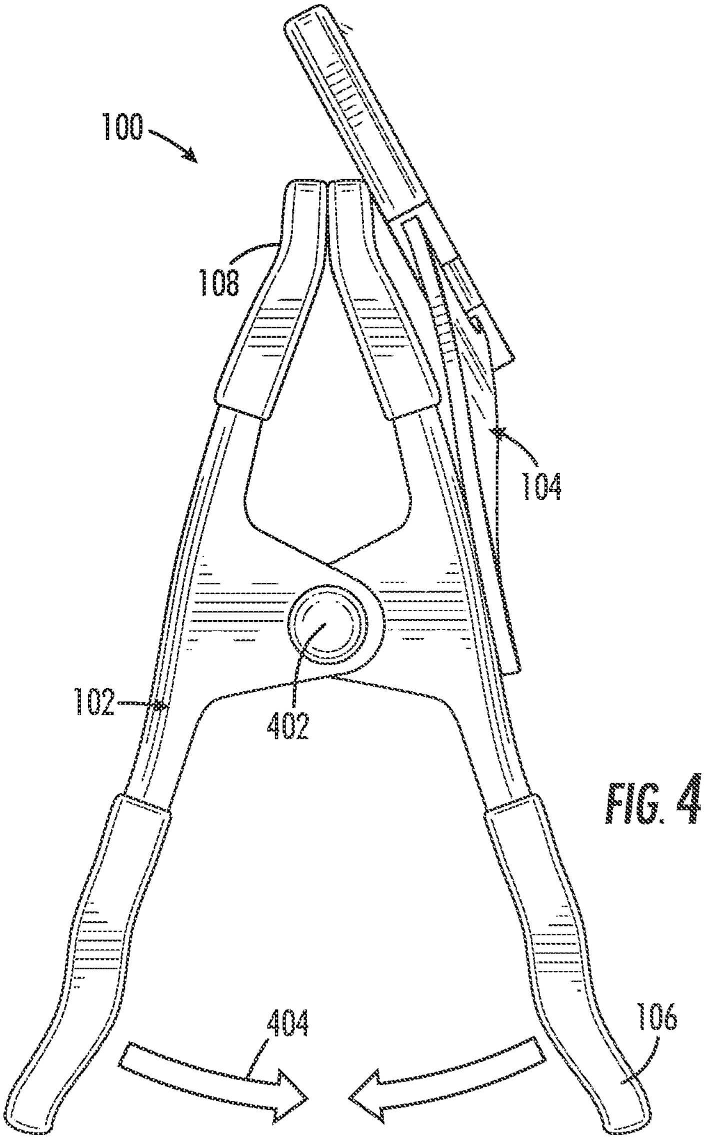
FIG. 4 is a left side view of a door knob handling apparatus, in accordance with an exemplary embodiment of the invention.
Figure 5:
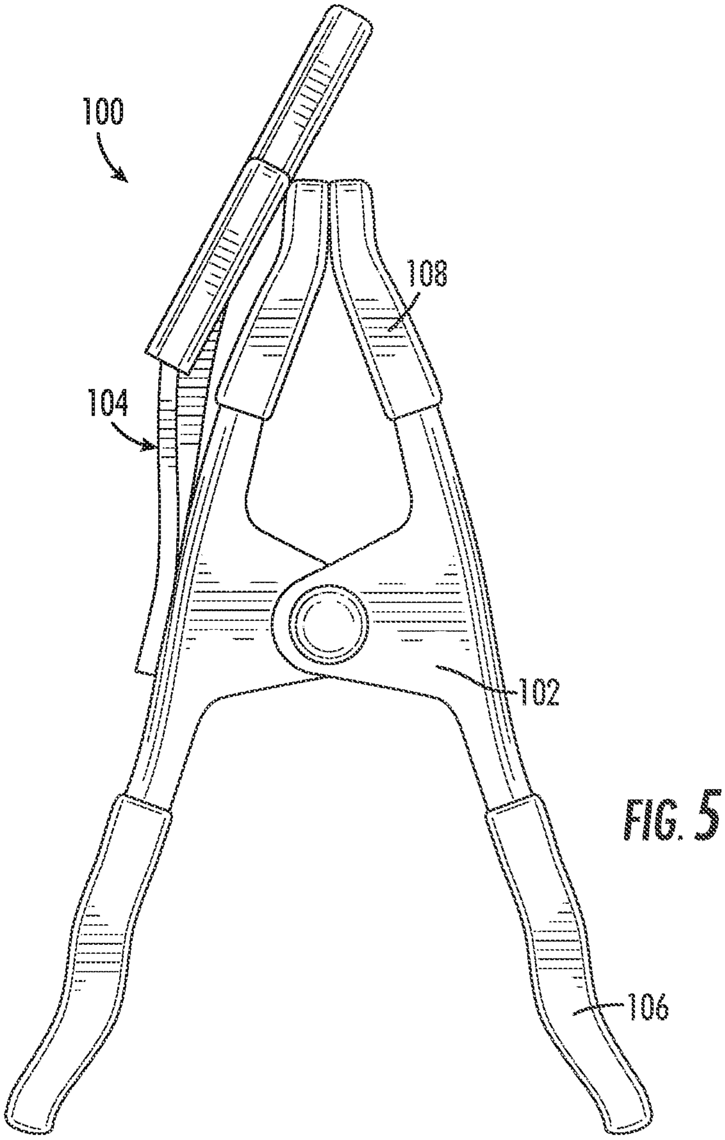
FIG. 5 is a right side view of a door knob handling apparatus, in accordance with an exemplary embodiment of the invention.

FIG. 4 is a left side view of the door knob handling apparatus 100, in accordance with an exemplary embodiment of the invention. From this view, and FIG. which is a right side view of the door knob handling apparatus 100, the configuration of the clamping section 102 can be more easily seen. In some embodiments of the invention, the clamping section primarily comprises two pieces, each configured with a handle side 106 and a gripping side 108, where the two pieces are rotatably attached to each other around a common axis, for example by a hinge 402 or pin joint configuration. In some aspects of the invention, the handles of the apparatus 100 are brought closer together in direction 404 in order to transition the clamping section 102 to an open configuration, for example to receive the side of a door 150 therein.

Figure 6:
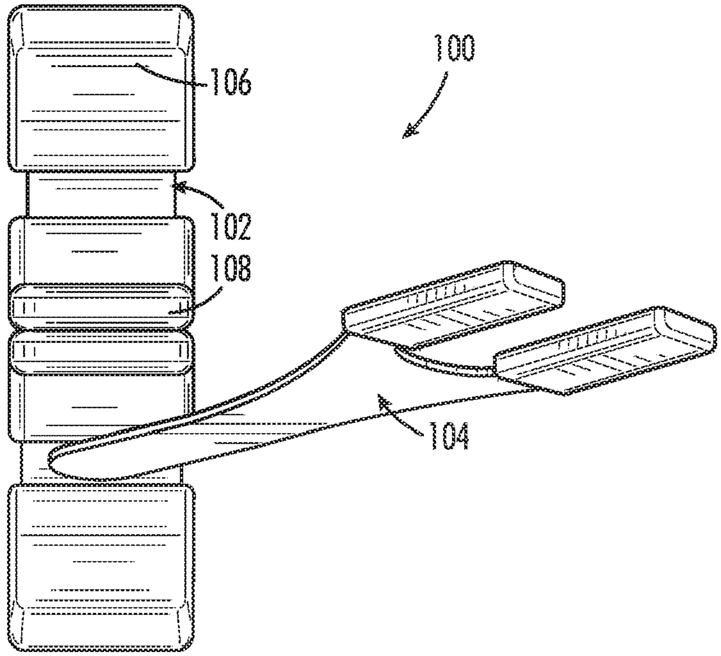
FIG. 6 is a front view of a door knob handling apparatus, in accordance with an exemplary embodiment of the invention.
Figure 7:
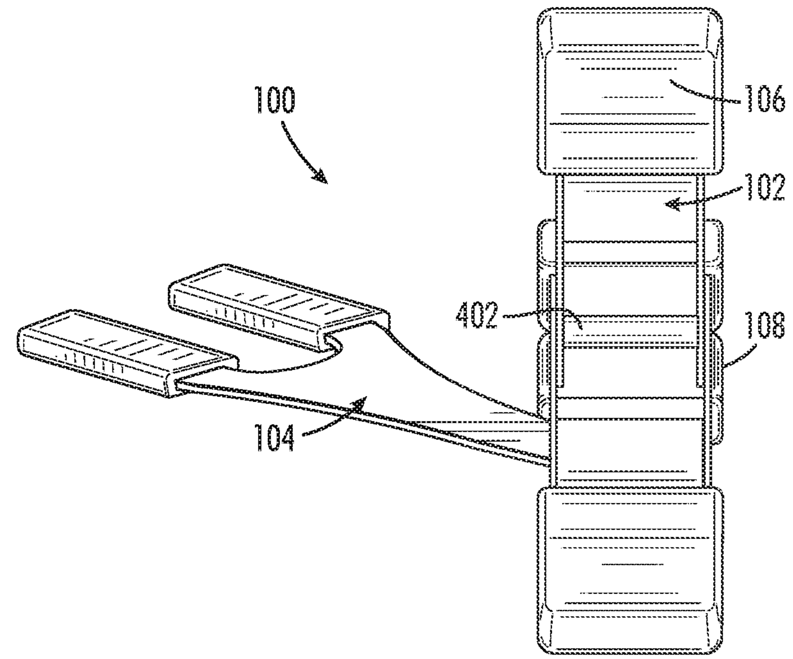
FIG. 7 is a back view of a door knob handling apparatus, in accordance with an exemplary embodiment of the invention; and, FIG. 8 is a flowchart of a method for using a door knob handling apparatus, in accordance with an exemplary embodiment of the invention.

FIGS. 6 and 7 are front and back views, respectively, of the door knob handling apparatus 100, in accordance with an exemplary embodiment of the invention.

Figure 8:
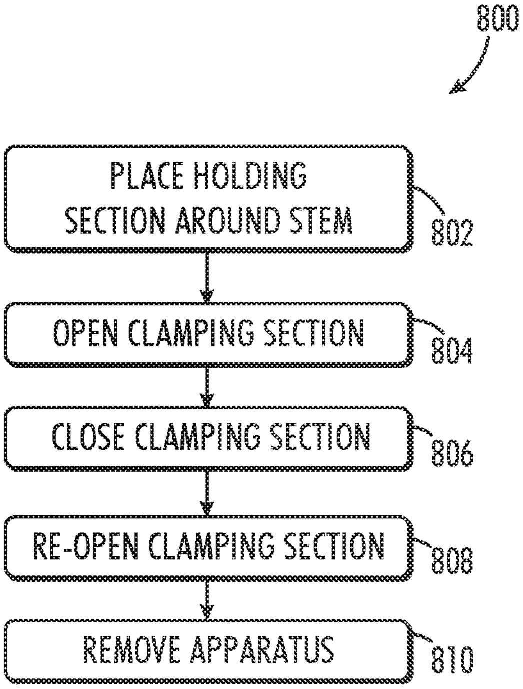

FIG. 8 is a flowchart of a method (800) for using the door knob handling apparatus 100, in accordance with an exemplary embodiment of the invention. In an embodiment, the yoke 204 of the holding section 104 is placed (802) around the stem of the door knob 152. In an embodiment of the invention, the clamping section 102 is opened (804) while the holding section is being placed (802) to allow for receipt of a side of the door 152 therein. The clamping section 102 is released/closed (806) when the door 150 is sufficiently located within the gripping side, thereby releasably securing the apparatus 100 to the door 150. After optionally maneuvering the door knob 152 and/or installing the door knob 152, the clamping section 102 is re-opened (808) to release the grip of the apparatus 100 on the door 150. The apparatus 100 is then removed (810) from the door entirely, leaving the door knob 150 installed. Optionally, a similar method (800) is used for installing a dead bolt, where instead of the holding section 104 being placed around the stem of a doorknob as a yoke, the yoke 204 is instead used to hold the face of the deadbolt (the face being raised from and substantially parallel to the surface of the door).

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. Further, described ranges are intended to include numbers outside any range described within statistical error and/or inherent measurement equipment limitations.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A door knob handling apparatus for installing a door knob to a door, comprising:

a clamping section configured to attach the apparatus to the door, wherein the clamping section includes a handle side and a gripping side forming a pincer; and, a holding section, including a y-shaped yoke, configured to hold a door knob stem of the door knob between both sides of the y-shaped yoke while the door knob is installed and attached to the clamping section, wherein the clamping section is spring loaded and biased by the spring to be in a closed or clamped position and where the door is held within the closed or clamped pincer when in use.

2. The door knob handling apparatus according to claim 1, further comprising padding or covers disposed on at least the handle side to enhance user comfort when gripping.

3. The door knob handling apparatus according to claim 1, further comprising covers disposed on the gripping side which are configured to enhance the gripping and friction of the gripping side on the door and to protect the surface of the door when the apparatus is clamped thereon.

4. The door knob handling apparatus according to claim 1, wherein the clamping section is configured to apply clamping pressure on a door up to 2 in. thick.

5. The door knob handling apparatus according to claim 1, wherein the clamping section is configured to apply clamping pressure on a door over 2 in. thick.

6. The door knob handling apparatus according to claim 1, wherein the holding section has covers disposed thereon which are configured to enhance the gripping and/or frictional forces between the door knob handling apparatus and the door knob.

7. The door knob handling apparatus according to claim 1, wherein the holding section is fixed in relation to the clamping section.

8. The door knob handling apparatus according to claim 1, wherein the holding section is rotatably attached to the clamping section.

9. The door knob handling apparatus according to claim 8, wherein the holding section is connected to the clamping section by a hinge or pin joint.

10. A method of using the door knob handling apparatus according to claim 1 for installing a door knob to a door, comprising:

placing each side of a y-shaped yoke of the door knob handling apparatus around a stem of the door knob;

opening a clamping section of the apparatus, the clamping section being spring loaded and biased by the spring to be in a closed or clamped position, and placing a gripping side forming a pincer of the clamping section around a side of the door;

closing the clamping section when the side of the door is located within the gripping side of the clamping section to releasably secure the apparatus to the door in the pincer;

re-opening the clamping section when the door knob has been installed to release the apparatus from the door; and, removing the apparatus from the door.

11. The method according to claim 10, wherein the door knob handling apparatus is clamped to the door at a location on the door where the holding section can be properly positioned to hold the door knob.

12. The method according to claim 11, wherein clamping factors in the length of the holding section and the angle of the door knob to the door knob handling apparatus.

13. The method according to claim 10, wherein the knob handling apparatus is turned over to hold a door knob on an opposite side of the door from the configuration of the apparatus where the clamping section is on one side of the apparatus and the holding section is on an opposite side of the apparatus with respect to the clamping section.

14. A method of using a door knob handling apparatus for installing a dead bolt to a door, comprising:

placing a y-shaped yoke of the door knob handling apparatus around or on a face of the dead bolt;

opening a clamping section of the apparatus, the clamping section being spring loaded and biased by the spring to be in a closed or clamped position, and placing a gripping side forming a pincer of the clamping section around a side of the door;

closing the clamping section when the side of the door is located within the gripping side of the clamping section to releasably secure the apparatus to the door in the pincer;

re-opening the clamping section when the dead bolt has been installed to release the apparatus from the door; and, removing the apparatus from the door.

15. The method according to claim 14, wherein the face is raised from and substantially parallel to the surface of the door.

* * * * *